US011875636B2

(12) United States Patent
Frenkel

(10) Patent No.: US 11,875,636 B2
(45) Date of Patent: *Jan. 16, 2024

(54) SYSTEMS AND METHODS FOR MULTI-PLAYER ELECTRONIC CARD GAME PLAY

(71) Applicant: AG 18, LLC, Denver, CO (US)

(72) Inventor: Brian Frenkel, Denver, CO (US)

(73) Assignee: AG 18, LLC, Denver, CO (US)

( * ) Notice: Subject to any disclaimer, the term of this patent is extended or adjusted under 35 U.S.C. 154(b) by 855 days.

This patent is subject to a terminal disclaimer.

(21) Appl. No.: 16/901,256

(22) Filed: Jun. 15, 2020

(65) Prior Publication Data

US 2020/0372751 A1 Nov. 26, 2020

Related U.S. Application Data

(63) Continuation of application No. 16/200,279, filed on Nov. 26, 2018, now Pat. No. 10,685,532, which is a continuation of application No. 15/880,025, filed on Jan. 25, 2018, now Pat. No. 10,140,809, which is a continuation of application No. 15/711,518, filed on (Continued)

(51) Int. Cl.
*G07F 17/32* (2006.01)

(52) U.S. Cl.
CPC .......... *G07F 17/3227* (2013.01); *G07F 17/32* (2013.01); *G07F 17/3209* (2013.01); *G07F 17/3211* (2013.01); *G07F 17/3218* (2013.01); *G07F 17/3241* (2013.01); *G07F 17/3246* (2013.01); *G07F 17/3248* (2013.01); *G07F 17/3251* (2013.01); *G07F 17/3255* (2013.01); *G07F 17/3258* (2013.01); *G07F 17/3272* (2013.01); *G07F 17/3276* (2013.01); *G07F 17/3293* (2013.01)

(58) Field of Classification Search
None
See application file for complete search history.

(56) References Cited

U.S. PATENT DOCUMENTS

| | | | |
|---|---|---|---|
| 4,685,677 | A | 8/1987 | Demar et al. |
| 4,760,527 | A | 7/1988 | Sidley |

(Continued)

FOREIGN PATENT DOCUMENTS

| | | | |
|---|---|---|---|
| CN | 101044520 | A | 9/2007 |
| JP | 2008-513110 | A | 5/2008 |

(Continued)

OTHER PUBLICATIONS

Japanese Patent Application No. 2020-013216, Office Action, 6 pages, dated Jun. 24, 2020.

(Continued)

*Primary Examiner* — Ronald Laneau

(57) ABSTRACT

A system for interactive gaming among a plurality of players includes a host computer system and a plurality of player terminals communicably coupled to the host computer system via a network. The plurality of player terminals are located at a plurality of licensed gaming locations. The plurality of player terminals are configured to engage the plurality of players in a common interactive game operated by the host computer system. The plurality of player terminals include means for dispensing player winnings from the player terminal.

20 Claims, 6 Drawing Sheets

Related U.S. Application Data

Sep. 21, 2017, now Pat. No. 9,881,449, which is a continuation of application No. 15/212,578, filed on Jul. 18, 2016, now Pat. No. 9,786,121, which is a continuation of application No. 14/880,001, filed on Oct. 9, 2015, now Pat. No. 9,396,611, which is a continuation of application No. 11/183,247, filed on Jul. 14, 2005, now Pat. No. 9,159,195.

(56) References Cited

U.S. PATENT DOCUMENTS

| | | | | |
|---|---|---|---|---|
| 4,926,327 | A | 5/1990 | Sidley | |
| 5,257,179 | A | 10/1993 | DeMar | |
| 5,472,194 | A | 12/1995 | Breeding et al. | |
| 5,755,621 | A | 5/1998 | Marks et al. | |
| 5,762,552 | A | 6/1998 | Vuong et al. | |
| 5,800,268 | A | 9/1998 | Molnick | |
| 5,816,915 | A | 10/1998 | Kadlic | |
| 5,882,260 | A | 3/1999 | Marks et al. | |
| 6,093,100 | A | 7/2000 | Singer et al. | |
| 6,264,561 | B1 | 7/2001 | Saffari et al. | |
| 6,347,086 | B1 | 2/2002 | Strachan | |
| 6,508,709 | B1 | 1/2003 | Karmarkar | |
| 6,676,522 | B2 | 1/2004 | Rowe | |
| 6,679,777 | B2 | 1/2004 | Pfeiffer et al. | |
| D512,466 | S | 12/2005 | White et al. | |
| 7,040,987 | B2 | 5/2006 | Walker et al. | |
| 7,100,916 | B2 | 9/2006 | Kelly et al. | |
| 7,306,516 | B2 | 12/2007 | Iosilevsky | |
| 7,367,563 | B2 | 5/2008 | Yoseloff et al. | |
| 7,680,038 | B1 | 3/2010 | Gourlay | |
| 7,699,695 | B2 | 4/2010 | White et al. | |
| 7,699,702 | B2 | 4/2010 | Daniel | |
| 7,758,411 | B2 | 7/2010 | Crawford, III et al. | |
| 7,794,324 | B2 | 9/2010 | White et al. | |
| 7,867,091 | B2 | 1/2011 | Moshal | |
| 7,914,381 | B2 | 3/2011 | Blythe et al. | |
| 8,460,109 | B2 | 6/2013 | Bryson et al. | |
| 8,529,349 | B2 | 9/2013 | Kelly et al. | |
| 8,535,158 | B2 | 9/2013 | Kelly et al. | |
| 8,888,578 | B2 | 11/2014 | Kelly et al. | |
| 9,786,121 | B2 * | 10/2017 | Frenkel | G07F 17/3251 |
| 2001/0004609 | A1 | 6/2001 | Walker et al. | |
| 2001/0019965 | A1 | 9/2001 | Ochi | |
| 2001/0044337 | A1 | 11/2001 | Rowe et al. | |
| 2002/0002075 | A1 | 1/2002 | Rowe | |
| 2002/0028707 | A1 | 3/2002 | Pascal et al. | |
| 2002/0049975 | A1 | 4/2002 | Thomas et al. | |
| 2002/0066996 | A1 | 6/2002 | Nelson et al. | |
| 2002/0094869 | A1 | 7/2002 | Harkham | |
| 2002/0098884 | A1 | 7/2002 | Adams | |
| 2002/0103028 | A1 | 8/2002 | Carter et al. | |
| 2002/0103029 | A1 | 8/2002 | Finlayson et al. | |
| 2002/0123377 | A1 | 9/2002 | Shulman | |
| 2002/0169015 | A1 | 11/2002 | Moody | |
| 2003/0003997 | A1 | 1/2003 | Vuong et al. | |
| 2003/0032474 | A1 | 2/2003 | Kaminkow | |
| 2003/0064805 | A1 | 4/2003 | Wells | |
| 2003/0109306 | A1 | 6/2003 | Karmarkar | |
| 2003/0125973 | A1 | 7/2003 | Mathews et al. | |
| 2003/0130041 | A1 | 7/2003 | Pascal et al. | |
| 2003/0139190 | A1 | 7/2003 | Steelberg et al. | |
| 2003/0176218 | A1 | 9/2003 | LeMay et al. | |
| 2004/0192431 | A1 | 9/2004 | Singer et al. | |
| 2004/0192442 | A1 | 9/2004 | Wells et al. | |
| 2005/0026696 | A1 | 2/2005 | Hashimoto et al. | |
| 2005/0037842 | A1 | 2/2005 | Kastner | |
| 2005/0043094 | A1 | 2/2005 | Nguyen et al. | |
| 2005/0090304 | A1 | 4/2005 | Crawford, III et al. | |
| 2005/0116020 | A1 | 6/2005 | Smolucha et al. | |
| 2005/0143169 | A1 | 6/2005 | Nguyen et al. | |
| 2005/0187020 | A1 | 8/2005 | Amaitis et al. | |
| 2005/0193209 | A1 | 9/2005 | Saunders et al. | |
| 2005/0215326 | A1 | 9/2005 | Iosilevsky | |
| 2006/0019745 | A1 | 1/2006 | Benbrahim | |
| 2006/0025221 | A1 | 2/2006 | Jain et al. | |
| 2006/0058008 | A1 | 3/2006 | Choksi | |
| 2006/0058088 | A1 | 3/2006 | Crawford, III et al. | |
| 2006/0080175 | A1 | 4/2006 | Rowe et al. | |
| 2006/0095790 | A1 | 5/2006 | Nguyen et al. | |
| 2006/0121968 | A1 | 6/2006 | Daniel | |
| 2006/0148560 | A1 | 7/2006 | Arezina et al. | |
| 2006/0189381 | A1 | 8/2006 | Daniel et al. | |
| 2006/0229122 | A1 | 10/2006 | Macke | |
| 2006/0258425 | A1 | 11/2006 | Edidin et al. | |
| 2006/0287103 | A1 | 12/2006 | Crawford et al. | |
| 2007/0015584 | A1 | 1/2007 | Frenkel | |
| 2007/0087834 | A1 | 4/2007 | Moser et al. | |
| 2007/0259716 | A1 | 11/2007 | Mattice et al. | |
| 2008/0020848 | A1 | 1/2008 | Muir et al. | |
| 2009/0062008 | A1 | 3/2009 | Karmarkar | |
| 2009/0227362 | A1 | 9/2009 | Kelly et al. | |
| 2009/0270175 | A1 | 10/2009 | Kelly et al. | |
| 2009/0318219 | A1 | 12/2009 | Koustas et al. | |
| 2010/0240431 | A1 | 9/2010 | Herrmann et al. | |
| 2012/0046110 | A1 | 2/2012 | Amaitis et al. | |
| 2014/0221071 | A1 | 8/2014 | Calio et al. | |
| 2014/0378219 | A1 | 12/2014 | Arnone et al. | |
| 2018/0012449 | A1 * | 1/2018 | Frenkel | G07F 17/3241 |
| 2018/0151025 | A1 * | 5/2018 | Frenkel | G07F 17/3272 |
| 2021/0407251 | A1 * | 12/2021 | Frenkel | G07F 17/32 |

FOREIGN PATENT DOCUMENTS

| | | | |
|---|---|---|---|
| JP | 2008-546443 | A | 12/2008 |
| JP | 5414273 | B2 | 11/2013 |
| JP | 2016-76230 | A | 5/2016 |
| KR | 2001-0050000 | A | 6/2001 |
| KR | 2006-0049774 | A | 5/2006 |
| WO | WO 2003/093921 | A2 | 11/2003 |
| WO | 2004/071601 | A2 | 8/2004 |

OTHER PUBLICATIONS

Japanese Patent Application No. 2020-013216, Office Action, 6 pages, dated Oct. 20, 2020.

Korean Patent Application No. 2020-7016736, Office Action, 4 pages, dated Sep. 11, 2020.

Australian Patent Application No. 2022200378, Examination Report, 7 pages, dated Mar. 28, 2023.

Decision Granting Institution Of Inter Partes Review for U.S. Pat. No. 10,497,220, *DraftKings Inc.* vs. *AG 18, LLC,* IPR2022-01442, 38 pages, Mar. 14, 2023.

Decision Granting Institution Of Inter Partes Review for U.S. Pat. No. 11,024,131, *DraftKings Inc.* vs. *AG 18, LLC,* IPR2022-01445, 33 pages, Mar. 14, 2023.

Decision Granting Institution Of Inter Partes Review for U.S. Pat. No. 9,978,205, *DraftKings Inc.* vs. *AG 18, LLC,* IPR2022-01446, 43 pages, Mar. 14, 2023.

Decision Granting Institution Of Inter Partes Review for U.S. Pat. No. 9,613,498, *DraftKings Inc.* vs. *AG 18, LLC,* IPR2022-01447, 57 pages, Mar. 14, 2023.

Decision Granting Institution Of Inter Partes Review for U.S. Pat. No. 10,614,657, *DraftKings Inc.* vs. *AG 18, LLC,* IPR2022-01448, 47 pages, Mar. 14, 2023.

Patent Owner's Response To Petition To Institute Inter Partes Review for U.S. Pat. No. 10,497,220, *DraftKings Inc.* vs. *AG 18, LLC,* IPR2022-01442, 69 pages, Jun. 7, 2023.

Patent Owner's Response To Petition To Institute Inter Partes Review for U.S. Pat. No. 11,024,131, *DraftKings Inc.* vs. *AG 18, LLC,* IPR2022-01445, 67 pages, Jun. 7, 2023.

Patent Owner's Response To Petition To Institute Inter Partes Review for U.S. Pat. No. 9,978,205, *DraftKings Inc.* vs. *AG 18, LLC,* IPR2022-01446, 72 pages, Jun. 7, 2023.

Patent Owner's Response To Petition To Institute Inter Partes Review for U.S. Pat. No. 9,613,498, *DraftKings Inc.* vs. *AG 18, LLC,* IPR2022-01447, 41 pages, Jun. 7, 2023.

Patent Owner's Response To Petition To Institute Inter Partes Review for U.S. Pat. No. 10,614,657, *DraftKings Inc.* vs. *AG 18, LLC,* IPR2022-01448, 52 pages, Jun. 7, 2023.

(56) References Cited

OTHER PUBLICATIONS

Petition For Inter Partes Review Of U.S. Pat. No. 10,497,220, *DraftKings Inc.* vs. *AG 18, LLC,* IPR2022-01442, 106 pages, Aug. 22, 2022.
Petition For Inter Partes Review Of U.S. Pat. No. 11,024,131, *DraftKings Inc.* vs. *AG 18, LLC,* IPR2022-01445, 94 pages, Aug. 30, 2022.
Petition For Inter Partes Review Of U.S. Pat. No. 9,978,205, *DraftKings Inc.* vs. *AG 18, LLC,* IPR2022-01446, 102 pages, Aug. 23, 2022.
Petition For Inter Partes Review Of U.S. Pat. No. 9,613,498, *DraftKings Inc.* vs. *AG 18, LLC,* IPR2022-01447, 102 pages, Aug. 23, 2022.
Petition For Inter Partes Review Of U.S. Pat. No. 10,614,657, *DraftKings Inc.* vs. *AG 18, LLC,* IPR2022-01448, 98 pages, Aug. 23, 2022.
International Application No. PCT/US2006/027339, International Search Report & Written Opinion, 6 pages, dated Jan. 16, 2007.
Japanese Patent Application No. 2018-023693, Office Action, 6 pages, dated May 29, 2018.
Japanese Patent Application No. 2018-198082, Office Action, 11 pages, dated Jan. 7, 2020.
Macau Patent Application No. I/1494, Office Action, 9 pages, dated Nov. 22, 2018.
Reagan, Ronald, "America's Great Economic Miracle," 3 pages, Mar. 1, 1975.
U.S. Pat. No. 9,159,195, Oct. 13, 2015, Interactive Gaming Among a Plurality of Players Systems and Methods.
U.S. Pat. No. 9,396,611, Jul. 19, 2016, Interactive Gaming Among a Plurality of Players Systems and Methods.
U.S. Pat. No. 9,786,121, Oct. 10, 2017, Interactive Gaming Among a Plurality of Players Systems and Methods.
U.S. Pat. No. 9,824,533, Nov. 21, 2017, Interactive Gaming in Licensed Locations.
U.S. Pat. No. 9,697,682, Jul. 4, 2017, Interactive Gaming Among a Plurality of Players Systems and Methods.
U.S. Pat. No. 9,947,176, Apr. 17, 2018, Interactive Gaming Among a Plurality of Players Systems and Methods.
U.S. Pat. No. 9,911,271, Mar. 6, 2018, Interactive Gaming Among a Plurality of Players Systems and Methods.
U.S. Pat. No. 9,881,449, Jan. 30, 2018, Interactive Gaming Among a Plurality of Players Systems and Methods.
U.S. Pat. No. 10,083,571, Sep. 25, 2018, Interactive Gaming Among a Plurality of Players Systems and Methods.
U.S. Pat. No. 10,140,808, Nov. 27, 2018, Interactive Gaming in Licensed Locations.
U.S. Pat. No. 9,940,780, Apr. 10, 2018, Variable Payback Gaming.
U.S. Pat. No. 10,210,705, Feb. 19, 2019, Interactive Gaming Among a Plurality of Players Systems and Methods.
U.S. Pat. No. 10,339,760, Jul. 2, 2019, Systems and Methods for Variable Payback Gaming.
U.S. Pat. No. 10,089,823, Oct. 2, 2018, Mechanisms for Detection of Gambling Rule Violations.
U.S. Appl. No. 15/875,476, filed Jan. 19, 2018, Interactive Gaming Systems With Artificial Intelligence.
U.S. Pat. No. 10,140,809, Nov. 27, 2018, Interactive Gaming Among a Plurality of Players Systems and Methods.
U.S. Pat. No. 10,078,939, Sep. 18, 2018, Interactive Gaming Among a Plurality of Players Systems and Methods.
U.S. Appl. No. 15/948,608, filed Apr. 9, 2018, Variable Payback Gaming.
U.S. Appl. No. 16/133,224, filed Sep. 17, 2018, Virtual Reality Interactive Gaming Systems and Methods.
U.S. Appl. No. 16/139,766, filed Sep. 24, 2018, Interactive Gaming Systems With Collusion Detection.
U.S. Pat. No. 10,325,449, Jun. 18, 2019, Mechanisms for Detection of Gambling Rule Violations.
U.S. Appl. No. 16/200,206, filed Nov. 26, 2018, Interactive Gaming in Licensed Locations.
U.S. Pat. No. 10,685,532, Jun. 16, 2020, Interactive Gaming Among a Plurality of Players Systems and Methods.
U.S. Appl. No. 16/277,530, filed Feb. 15, 2019, Systems and Methods for Variable Payback Gaming With Gambling Rule Violation Detection.
U.S. Appl. No. 16/397,783, filed Apr. 29, 2019, Customized Collusion Avoidance Policies for Esports.
U.S. Appl. No. 16/459,395, filed Jul. 1, 2019, Systems and Methods for Variable Payback Gaming.
U.S. Appl. No. 16/443,361, filed Jun. 17, 2019, Mechanisms for Detection of Gambling Rule Violations Including Assisted or Automated Gameplay.
U.S. Pat. No. 9,589,417, Mar. 7, 2017, Interactive Gaming Among a Plurality of Players Systems and Methods.
U.S. Pat. No. 9,875,610, Jan. 23, 2018, Monitoring of Interactive Gaming Systems.
U.S. Pat. No. 9,704,335, Jul. 11, 2017, Interactive Gaming Among a Plurality of Players Systems and Methods.
U.S. Pat. No. 9,830,768, Nov. 28, 2017, Interactive Gaming Among a Plurality of Players Systems and Methods.
U.S. Pat. No. 10,275,981, Apr. 30, 2019, Customized Collusion Avoidance Policies.
U.S. Pat. No. 9,613,498, Apr. 4, 2017, Systems and Methods for Peer-To-Peer Gaming.
U.S. Pat. No. 9,978,205, May 22, 2018, Location Based Restrictions on Networked Gaming.
U.S. Pat. No. 10,614,657, Apr. 7, 2020, Location Based Restrictions on Networked Gaming.
U.S. Appl. No. 16/841,081, filed Apr. 6, 2020, Location Based Restrictions on Networked Gaming.
U.S. Appl. No. 16/700,887, filed Dec. 2, 2019, Location Based Restrictions on Networked Gaming.
U.S. Pat. No. 10,497,220, Dec. 3, 2019, Location Based Restrictions on Networked Gaming.
U.S. Pat. No. 10,692,325, Jun. 23, 2020, Location Based Restrictions on Networked Gaming.
U.S. Appl. No. 16/146,989, filed Sep. 28, 2018, Location Based Restrictions on Networked Gaming.
Japanese Patent Application No. 2020-013216, Office Action, 9 pages, dated Oct. 20, 2020 (includes English translation).
Korean Patent Application No. 2020-7012392, Office Action, 12 pages, dated Aug. 26, 2020 (includes English translation).
Korean Patent Application No. 2020-7016736, Office Action, 8 pages, dated Sep. 11, 2020 (includes English translation).
Macau Patent Application No. I/1494, Office Action, 12 pages, dated Nov. 22, 2018 (includes English translation).
Australian Patent Application No. 2022200378, Examination Report No. 2, 6 pages, dated Jul. 6, 2023.
Australian Patent Application No. 2022200378, Examination Report No. 3, 5 pages, dated Oct. 3, 2023.

* cited by examiner

SYSTEMS AND METHODS FOR MULTI-PLAYER ELECTRONIC CARD GAME PLAY

CROSS REFERENCE TO RELATED APPLICATION

This application is a continuation of U.S. patent application Ser. No. 16/200,279 entitled "Interactive Gaming Among A Plurality Of Players Systems And Methods," filed on Nov. 26, 2018, now allowed and issued on Jun 16, 2020 as U.S. Pat. No. 10,685,532; which is a continuation of U.S. patent application Ser. No. 15/880,025 entitled "Interactive Gaming Among A Plurality Of Players Systems And Methods," filed on Jan. 25, 2018, and issued on Nov. 27, 2018 as U.S. Pat. No. 10,140,809; which is a continuation of U.S. patent application Ser. No. 15/711,518 entitled "Interactive Gaming Among A Plurality Of Players Systems And Methods," filed on Sep. 21, 2017, and issued on Jan. 30, 2018 as U.S. Pat. No. 9,881,449; which is a continuation of U.S. patent application Ser. No. 15/212,578 entitled "Interactive Gaming Among A Plurality Of Players Systems And Methods," filed on Jul. 18, 2016, and issued on Oct. 10, 2017 as U.S. Pat. No. 9,786,121; which is a continuation of U.S. patent application Ser. No. 14/880,001 entitled "Interactive Gaming Among A Plurality Of Players Systems And Methods," filed on Oct. 9, 2015, and issued on Jul. 19, 2016 as U.S. Pat. No. 9,396,611; which is a continuation of U.S. patent application Ser. No. 11/183,247 entitled "Interactive Gaming Among A Plurality Of Players Systems And Methods," filed Jul. 14, 2005, and issued on Oct. 13, 2015 as U.S. Pat. No. 9,159,195; the contents of each of which are hereby incorporated by reference herein in their entirety for all purposes.

BACKGROUND OF THE INVENTION

Embodiments of the invention relate generally to gaming systems. More specifically, embodiments of the invention relate to systems and methods for providing interactive gaming among a plurality of players.

The popularity of gambling generally and poker specifically has increased at extraordinary rates. Many casinos are opening or reopening poker rooms and Internet poker sites are popping up regularly. New players are coming to the game daily.

There are, however, several impediments to new players joining the ranks of poker players. First, with respect to Internet poker, the legality of Internet poker has not been tested, despite its ever-increasing popularity. Many people simply do not want to risk the possibility of running afoul of the law. Second, many people are simply not comfortable interacting with off-shore enterprises, which is where Internet poker sites are located to avoid the reach of US laws. In order to play at these sites, players must deposit money, which is not immediately accessible by the player. Many people do not trust off shore sites to hold their money. Third, creating an account at an Internet poker site requires a potential player to divulge personal information that many people simply do not wish to share. No one knows the limits of how the information will be used. Further, some people prefer anonymity, which is simply not possible with known Internet poker sites. Hence, for at least these reasons, many people are not becoming poker players through Internet poker opportunities who otherwise would.

Casino poker tables provide its own impediments to new players. For example, the process of getting on a list to play, getting into a table game, and interacting with the many characters you will find in a poker room often intimidates new players to the point of disinterest.

For at least the foregoing reasons, improved systems and methods are needed for providing interactive gaming opportunities to players.

BRIEF SUMMARY OF THE INVENTION

Embodiments of the invention provide a system for interactive gaming among a plurality of players. The system includes a host computer system and a plurality of player terminals communicably coupled to the host computer system via a network. The plurality of player terminals are located at a plurality of licensed gaming locations. The plurality of player terminals are configured to engage the plurality of players in a common interactive game operated by the host computer system. The plurality of player terminals include means for dispensing player winnings from the player terminal.

In some embodiments, the interactive game may be poker. The host computer system may be located at a location different from any of the plurality of player terminals. Each player terminal may include means for receiving player deposits. The means for receiving player deposits may include a bill accepter. One or more of the plurality of player terminals may include means for receiving a user input to view hole cards dealt to the user in the course of the interactive game. The hole cards otherwise may not be viewable at the terminal. The host computer system may include means for monitoring actions taken by one or more of the plurality of players to thereby detect collusion among the players. The host computer system may include means for tracking one or more jackpots payable by an operator of one of the plurality of licensed gaming locations. The at least one of the one or more jackpots may include a high hand jackpot for making a specific hand. The at least one of the plurality of player terminals may include means for displaying at least one of the one or more jackpots payable by an operator of the host computer system. The host computer system may include means for tracking one or more jackpots payable by an operator of the host computer system. At least one of the one or more jackpots may include a bad beat jackpot for having a hand with a value at or above a specific value beaten by a hand with a value at or above a different specific value. At least one of the plurality of player terminals may include means for displaying at least one of the one or more jackpots payable by an operator of the host computer system. The host computer system may include means for tracking a player's play to thereby reward the player for player loyalty. The player terminals at a given location may be arranged to thereby inhibit collusion among players using the player terminals at the given location while engaged in a common game.

In other embodiments, a system for interactive gaming among a plurality of players includes a host computer system and a plurality of player terminals communicably coupled to the host computer system via a network. The plurality of player terminals are located at a plurality of licensed gaming locations. The plurality of player terminals are configured to anonymously engage the plurality of players in a common interactive game operated by the host computer system.

In still other embodiments a method of operating an interactive game among a plurality of players includes initiating a game session at a host computer system. The method also includes joining the plurality of players to the game session via a network. The players are operating player terminals located at a plurality of licensed gaming locations. At least one of the plurality of players is joined to the game without creating a user account relating to the interactive game. The method also includes initiating the game and, from the host computer system, sending signals relating to the state of the game to the player terminals. The method further includes, at a host computer system, iteratively receiving signals from the player terminals. The signals indicate player actions in the game. The method further includes, at the conclusion of the game, awarding value to a winning player.

In some embodiments the method includes dispensing player winnings to one of the players from the player's player terminal. The interactive game may be poker. The host computer system may be located at a location different from any of the plurality of player terminals. The method may include receiving a deposit from a player at one of the player terminals. Receiving a deposit from a player at one of the player terminals may include receiving a deposit from a player via a bill accepter. The method may further include, at a player terminal, receiving a user input to view hole cards dealt to the user in the course of the interactive game. The hole cards otherwise may not be viewable at the terminal. The method also may include monitoring actions taken by one or more of the plurality of players to thereby detect collusion among the players. The method also may include tracking one or more jackpots payable by an operator of one of the plurality of licensed gaming locations. At least one of the one or more jackpots may be a high hand jackpot for making a specific hand. The method may include, at a player terminal, displaying at least one of the one or more jackpots payable by an operator of the host computer system. The method may include tracking one or more jackpots payable by an operator of the host computer system. At least one of the one or more jackpots may be a bad beat jackpot for having a hand with a value at or above a specific value beaten by a hand with a value at or above a different specific value. The method also may include, at a player terminal, displaying at least one of the one or more jackpots payable by an operator of the host computer system. The method may include tracking a player's play to thereby reward the player for player loyalty. The method may include arranging terminals at a given location to thereby inhibit collusion among players using the player terminals at the given location while engaged in a common game. The method may include inhibiting collusion among players using the player terminals at the given location while engaged in a common game by prohibiting a player from joining a specific game session at a terminal proximate a player terminal of another player engaged in the specific game session.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
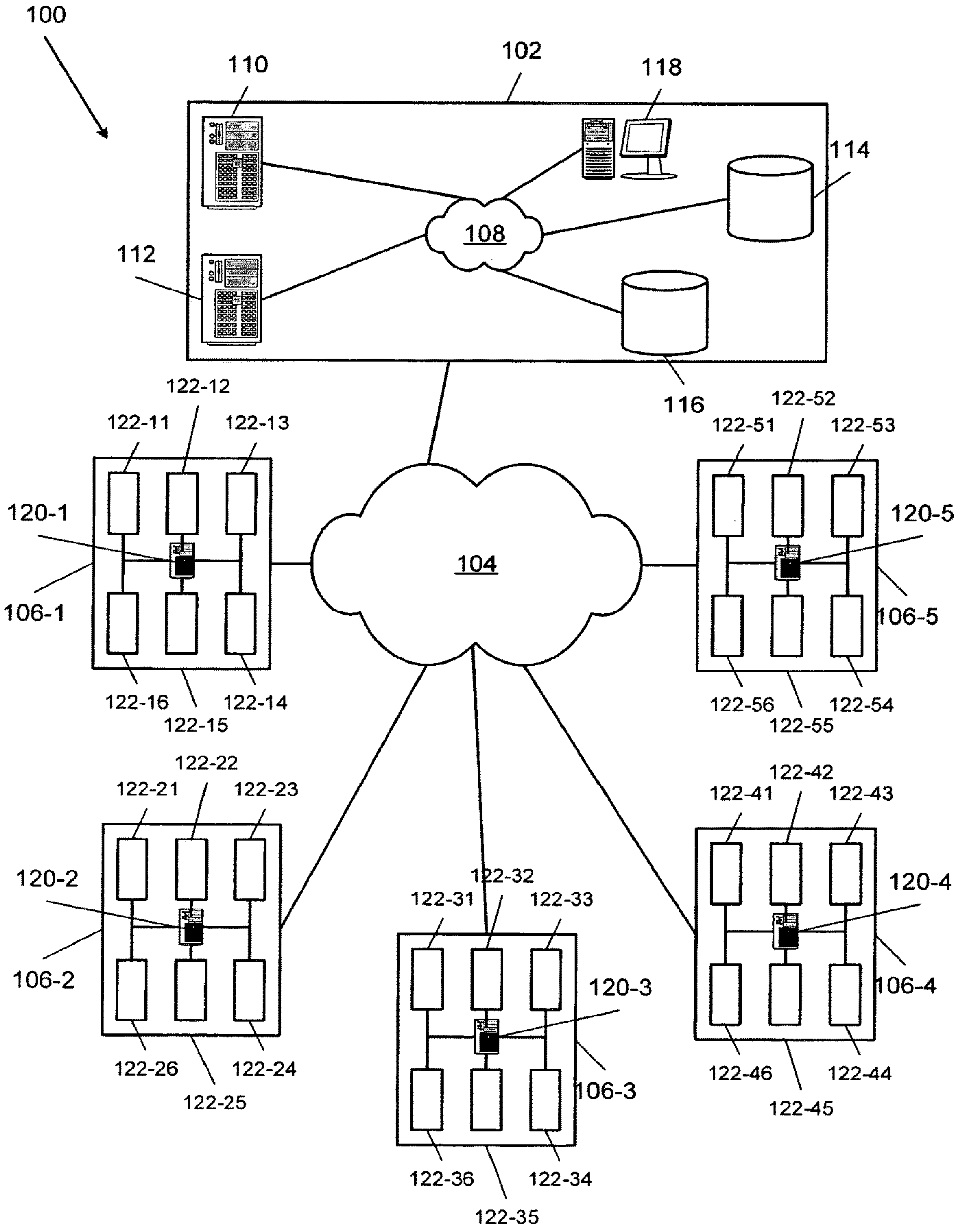
FIG. 1 illustrates an exemplary interactive gaming system according to embodiments of the invention.

Embodiments of the present invention provide networked, interactive gaming. According to embodiments of the invention, players may engage in interactive games such as poker, blackjack, and the like, via a network. "Networked" gaming allows players to participate from different locations, although in some embodiments, players may play from a common location via a local network. The game, however, is typically administered by a processor separate from a player's terminal. By allowing participation from a large number of locations simultaneously, the quality and variety of the gaming opportunity is enhanced through increased demand. "Interactive games," unlike, for example, slots, require at least one player decision after the game has begun. With respect to poker, for example, a player must decide whether to bet, raise, call, or fold after having seen his cards and the action of other players. With respect to blackjack, a player must decide whether to hit, stand, split, double down, or surrender after having seen his cards and the dealer's up card. Other games have similar actions during the progress of the game, which contrasts with slot machines in which players merely decide to initiate a game, after which no player decision is made until the conclusion of the game. In other words, no intermediate decisions are made in noninteractive games.

Embodiments of the invention also provide players the opportunity to participate in networked gaming anonymously. Unlike, for example, Internet poker, in which a player must disclose at least some personal information to create a player account, embodiments of the present invention allow players to enter a game without disclosing any personal information. While some embodiments provide loyalty programs to encourage longer sessions, return customers, and the like, players are not required to participate in loyalty programs. Players may simply deposit funds into a player terminal and enter a game. Hence, no disclosure of personal information is required to participate in games according to embodiments of the present invention.

Further, according to embodiments of the present invention, player terminals are located at licensed gaming locations. This also contrasts with Internet poker and the like, wherein player terminals (e.g., personal computers) may be located anywhere. Hence, according to embodiments of the invention, a player may engage in these games without fear of running afoul of gambling laws. While locations may include casinos, restaurants, bars, race tracks, hotels (including individual hotel rooms), and the like, players are secure in the fact that the location is authorized to provide the gaming opportunity.

Further still, in some embodiments, efforts are made to protect players from unsavory activities that have prevented the emergence of such gaming opportunities heretofore. For example, collusion and other forms of cheating are addressed through player terminal placement, privacy features, electronic monitoring, and/or the like. Hence, players are provided an enhanced gaming opportunity, even with respect to "live" games in which cheating is often hard to detect, since a casino does not see every player's hole cards, players are able to "mark" cards since the cards are physically handled, and colluding players can use sophisticated forms of signaling that go unnoticed by the dealer, floor personnel, or the "eye in the sky."

Players also may compete for enhanced prizes over and above the current "pot." For example, in poker, players may be given bonus jackpots for hitting a certain, usually rare, hand (e.g., a Royal Flush). Also, players may receive a "consolation prize" in the form of a "bad beat" jackpot (e.g., having an aces full house beaten by four of a kind or better). These jackpots may be progressive and could grow to be much more valuable than the contested pot. In blackjack, players can receive bonuses for hitting, for example, an ace and jack of spades blackjack. These and other features and enhancements will be described more fully in the ensuing detailed description.

Attention is directed to FIG. 1, which illustrates an exemplary gaming network 100 according to embodiments of the invention. The gaming network 100 includes a host computer system 102 and a communications network 104 through which a plurality of gaming locations 106 communicate with the host computer system. It should be appreciated that the gaming network 100 is merely exemplary of a number of possible gaming network configurations according to embodiments of the present invention. Further, although the ensuing description will relate to a poker gaming network, this is not a requirement. Embodiments of the present invention may relate to many other types and varieties of games.

This exemplary host computer system 102 includes an internal network 108, a web server 110, a game server 112, a game storage arrangement 114, a player storage arrangement 116, and an administrator computing device 118. In this specific embodiment, the various components of the host computer system 102 are co-located; in other embodiments, the components may be distributed geographically. As those skilled in the art will appreciate, other exemplary host computer systems according to embodiments of the invention may include different components than those illustrated and described herein.

Each gaming location 106 may include a local server 120 and one or more player terminals 122. In some embodiments, the local server 120 may simply facilitate communication between the player terminals 122 and the host computer system 102. In other embodiments, the local server 120 administers the games, tracks players for loyalty purposes, manages player deposits, and/or the like.

The various servers, networks, computing devices, and storage arrangements may be any of a variety of well-known devices. For example, in some embodiments, the communication network 104 is the Internet, the servers 110, 112, 120 are standard products offered, for example, by Dell Corp., the storage arrangements 114, 116 are typical optical, magnetic, solid state, or similar mass storage devices, and the administrator computing device 118 is a typical desktop computer. The player terminals 122 will be described in greater detail below.

According to embodiments of the invention, the gaming locations 106 are licensed gaming locations such as casinos, race tracks, or the like. In some embodiments, the gaming locations 106 are gas stations, hotels, stores, airports, or other locations at which gaming is legal. The gaming locations 106 specifically exclude residences or other locations where gaming is not legal.

It is important to note that the gaming locations need not be attended. Players are able to enter and exit games, deposit and receive money, interact with the player's terminal, and the like, without the assistance of an attendant at the gaming location.

The player terminals 122 at the gaming locations 106 may be in wired or wireless communication with the local server 120. It should be appreciated that the terminals may be wirelessly connected directly to the host computer system 102 via the communications network 104. Other examples are possible. In some embodiments, hotel guests at casino/hotels may "check out" player terminals 122 and engage in gaming from their hotel rooms. In other embodiments, player terminals are in every room in a hotel and players may engage in gaming using the terminals without ever leaving their rooms.

As will be described in greater detail below, in some embodiments players can anonymously engage in games via the gaming network 100. That is, a player may insert cash into a terminal, select a game, and begin playing without creating a user account. This is a significant difference between embodiments of the present invention and previously-known gaming networks such as Internet poker in which players must create user accounts.

As will be described in greater detail hereinafter, players may engage in interactive games from any location. For example, players at terminal 122-21 and 122-25 from gaming location 106-2 may be involved in the same poker game as players using terminals 122-53 and 122-56 from the gaming location 106-5. The host computer system 102 administers the game, distributing information about the action of the game to appropriate player terminals. Cards are dealt to players in the game, although players are only able to view their own cards and any community cards. Betting proceeds from one player to the next, and the host computer system 102 informs each player of the action prior to his turn.

Of course, all players in a particular game may be playing from the same location. The players may be playing next to one another at a common bank of machines or they may be distributed throughout the gaming location (e.g., some in their hotel rooms, some on one floor of a casino, and the reminder on another floor of the casino). Many examples are possible.

It is important to note, however, that gaming locations and the gaming network operator may take special steps to ensure players are not the victim of collusion or other forms of cheating. For example, if two players playing from the same location are within eye sight of each other's terminals, then they may be able to see each other's hole cards or signal each other their holding. This form of collusion provides these players with a significant advantage over other players in the game. Similarly, an individual player may be the innocent victim of another player who can see his hole cards without his knowledge. Hence, the gaming location may employ any of a number of measures to prevent such cheating.

In some embodiments, when a player enters a game from a specific terminal at a gaming location, other terminals within proximity (e.g., three rows of machines, 100 feet, the same floor of the casino, etc.) of the player's terminal may be locked out of the game the player entered. Of course, nothing would prevent two players seated at terminals next to one another from playing in different games. Similarly, wireless terminals may have features that allow them to know when they are in proximity of one another and perform similar lockouts.

With respect to an individual player who has another player looking over his shoulder to see his hole cards, player terminals may have a "hole card reveal" button or the like that allows players to quickly view their hole cards, whereas the cards are otherwise "face down" on the terminal display. While not a guarantee that other players cannot see his cards, a player using such a feature is better able to protect his hand. Shielding on the terminal and/or smaller displays or other features may be used to enhance a player's ability to protect his hand.

Despite all efforts to minimize cheating through visual means, players may nevertheless collude by talking to one another via cell phones or the like. Such collusion may be dealt with in any of a variety of ways. For example, player terminals or the gaming location in general may employ electronic countermeasures that disrupt cell phone signals. More likely, however, the gaming network operator may employ collusion detection software that monitors player action. Since the host computer system 102 knows all players' cards, unusual action by a player may trigger a flag, after which the player's action is given higher scrutiny. Players suspected of colluding may be immediately barred from a game and their deposits held pending resolution.

Figure 2:
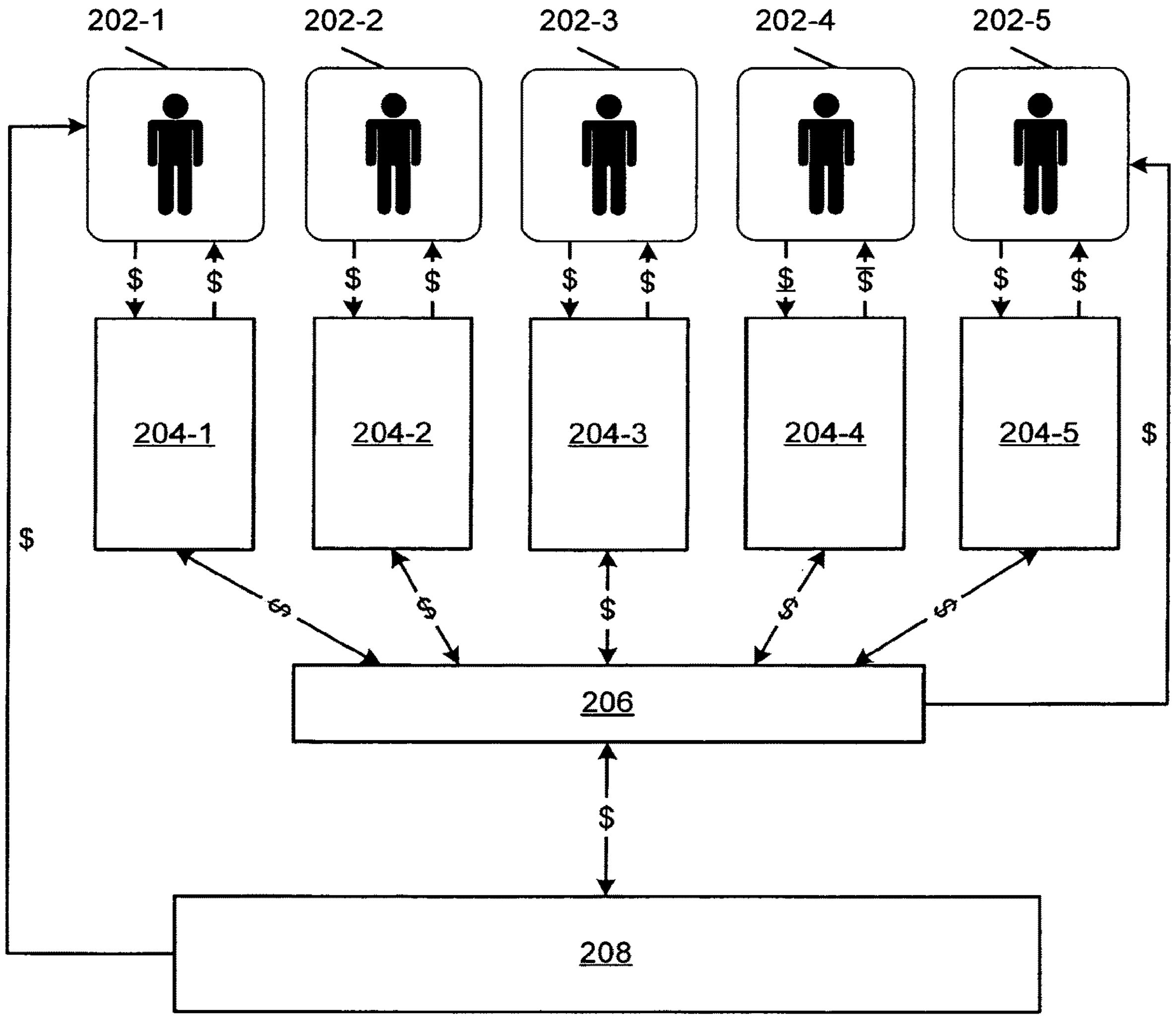
FIG. 2 illustrates graphically one example of how funds flow in an interactive gaming system, such as the system of FIG. 1, according to embodiments of the invention.

Having generally described a gaming network 100 according to embodiments of the invention, attention is directed to FIG. 2, which provides greater detail relating to the flow of funds in such a network. According to this example, players 202 engage in gaming using player terminals 204. The players 202 may insert value (e.g., cash, points, credits, etc.) into the terminals 204 to thereby engage in the games offered by the terminal. When a player 202-1 is ready to cash out of a game, the terminal 204-1 is configured to dispense value back to the player 202.

Excess value travels from the player terminals 204 to a local depository 206 and/or vice versa. In some cases, the value moves electronically, for example, if the value is measured in points or credits. In other cases, e.g., if the value is in the form of paper currency and/or coin, value is physically moved from the local depository 206 to the player terminals 204 ("terminal fills") and vice versa. Occasionally, player cash outs are handled from the local depository 206 directly to the player. In one such example, a player 202-5 is due a higher cash out than the terminal 204-5 can provide. The player 202-5 may have experienced an exceptional winning session, the gaming location may require the player 202-5 to complete tax forms for IRS reporting, the player 202-5 may have won a specialty jackpot that is paid from the local depository 206, the player terminal 204-5 may be configured to only print "tickets" which players 202 redeem for cash at a cashier's cage, and/or the like. Many such examples exist.

In some examples, value is paid from a local depository 206 to a central depository 208 and vice versa. As in the immediately-previous discussion, the central depository 208 may occasionally pay value directly to a player 202-1.

In a specific embodiment, the local depository 206 is a licensed gaming location and the central depository 208 is the operator of the gaming network 100. The operator enlists the gaming location to house terminals in return for a portion of the revenue generated by the network. The compensation to the gaming location may be in proportion to the revenues generated at the gaming location. For example, if the gaming network operator provides interactive poker, each contested pot may be "raked" a certain percentage (e.g., 3% to a maximum of $4). Hence, the winning player's pot may be light a $4 rake. The gaming locations from which the players are engaged in the game may keep $2 of the $4, while the remainder is remitted to the operator. Because players may engage in the same poker game from different locations, occasional revenue balancing may be required to compensate gaming locations at which players have winnings in excess of deposits. Likewise, locations at which players lose more over a period of time provide the excess to the operator for distribution to the locations with the higher wins.

Individual gaming locations and/or the operator of the gaming network may offer promotions to increase player interest. For example, as will be described in greater detail hereinafter, gaming locations may offer "high hand" jackpots. Such jackpots are paid to players for making particular high hands such as four aces, a royal flush, or the like. The jackpot may be reset to a starting value (e.g., $100 for four aces) and increase in proportion to revenues at the gaming locations until the high hand is again hit. Different gaming locations may have different high hand jackpot amounts. In fact, the high hand may be game specific, i.e., there may be one high hand jackpot for four aces in all Texas Hold'em games and a different four aces high hand jackpot for 7-card Stud games. Jackpots also maybe specific to various game limits. High hand jackpots may be paid to players directly from the local depository 206.

The gaming network operator also may offer specialty jackpots, such as "bad beat" jackpots, in which players who have a high value hand beaten may share (e.g., four-of-a-kind beaten by a higher hand). As with the high hand jackpots, bad beat jackpots may reset to a nominal value after being hit and increase as a function of revenue. The revenue base for a bad beat jackpot offered by the gaming network operator may be substantially larger than the revenue base for locally-offered high hand jackpots, in which case the bad beat jackpot may grow at a faster rate. As with the high hand jackpots, bad beat jackpots may be game and limit specific.

Of course, the preceding discussion should not be understood to limit bad beat jackpots to being offered by the gaming network operator or high hand jackpots to being offered by the local gaming location. Further, other types and varieties of jackpots may be offered at any level of the network.

Figure 3:
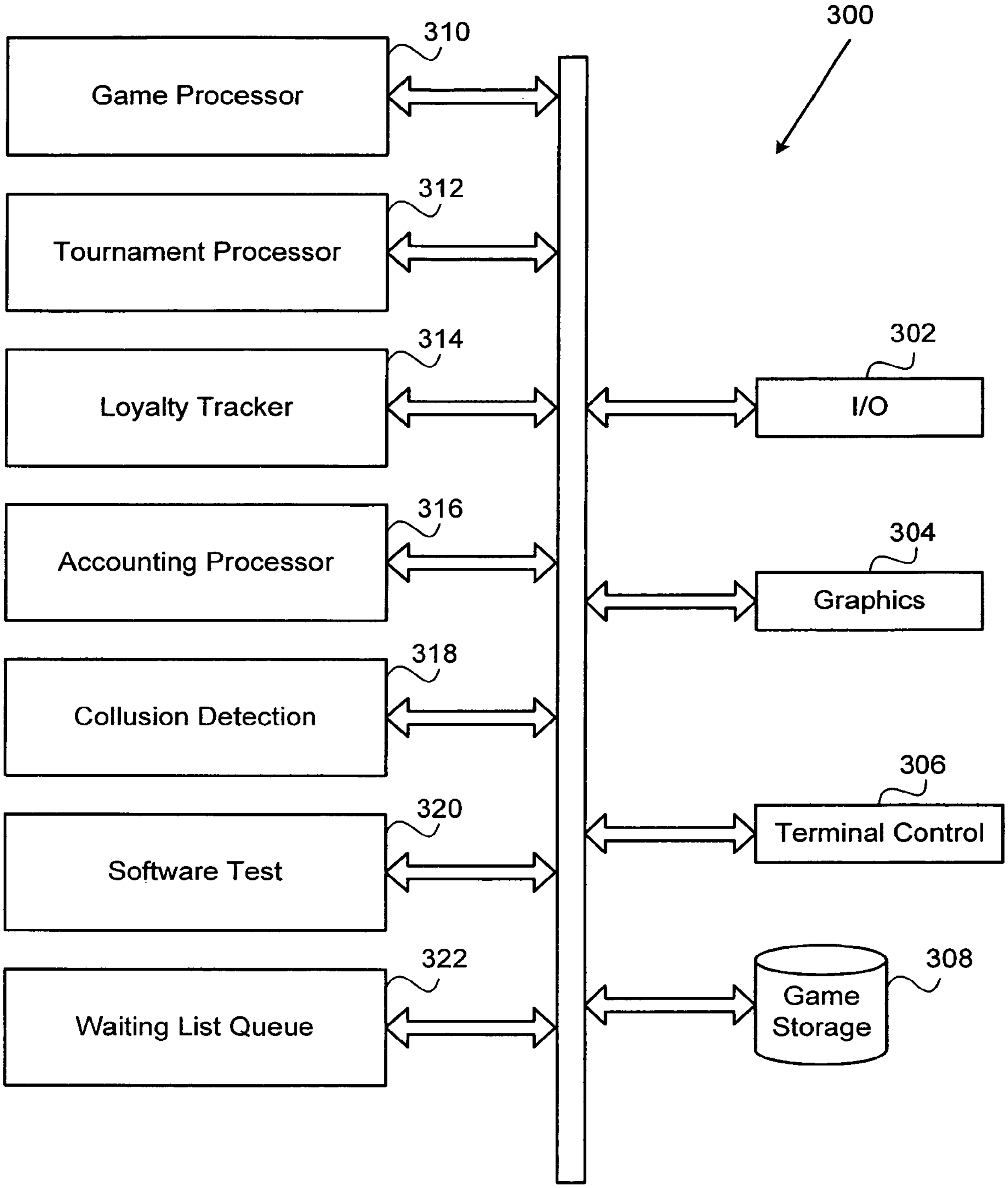
FIG. 3 illustrates an exemplary processing environment for an interactive gaming system according to embodiments of the invention.

Attention is directed to FIG. 3, which illustrates an exemplary functional diagram 300 of the host computer system 102. The functional diagram 300 depicts several program modules as well as basic computer functions. For example, the I/O module 302 handles input to and output from a processing environment and/or the communications network 104. The graphics module 304 provides control over the graphics displayed on player terminals and/or administrative computers. The terminal control module 306 provides the capability of the host computer system 102 to interact with and/or control a player terminal. The game storage arrangement 308 houses software or other computer-executable code that controls the games offered.

A number of processing environments are also included in some embodiments. For example, a game processor 310 controls one or more interactive games using the computer executable code from the game storage arrangement 308. A tournament processor 312 performs a similar function for player tournaments. A loyalty tracker 314 keeps up with the play of registered players to thereby reward players for the amount of time they spend playing. An accounting processor 316 controls the flow of money and/or other forms of value within the network. A collusion detection processor 318 monitors such things as unusual action taken by a specific player, frequent occurrences of the same players playing together in the same games, and the like. A software test environment 320 allows new games and/or processes to be tested in an environment that does not affect ongoing operations. A waiting list queue 322 allows players to wait in line for a specific game or table.

Those skilled in the art will appreciate that this is but one of many possible exemplary functional diagrams for a gaming network according to embodiments of the invention.

Figure 4A:
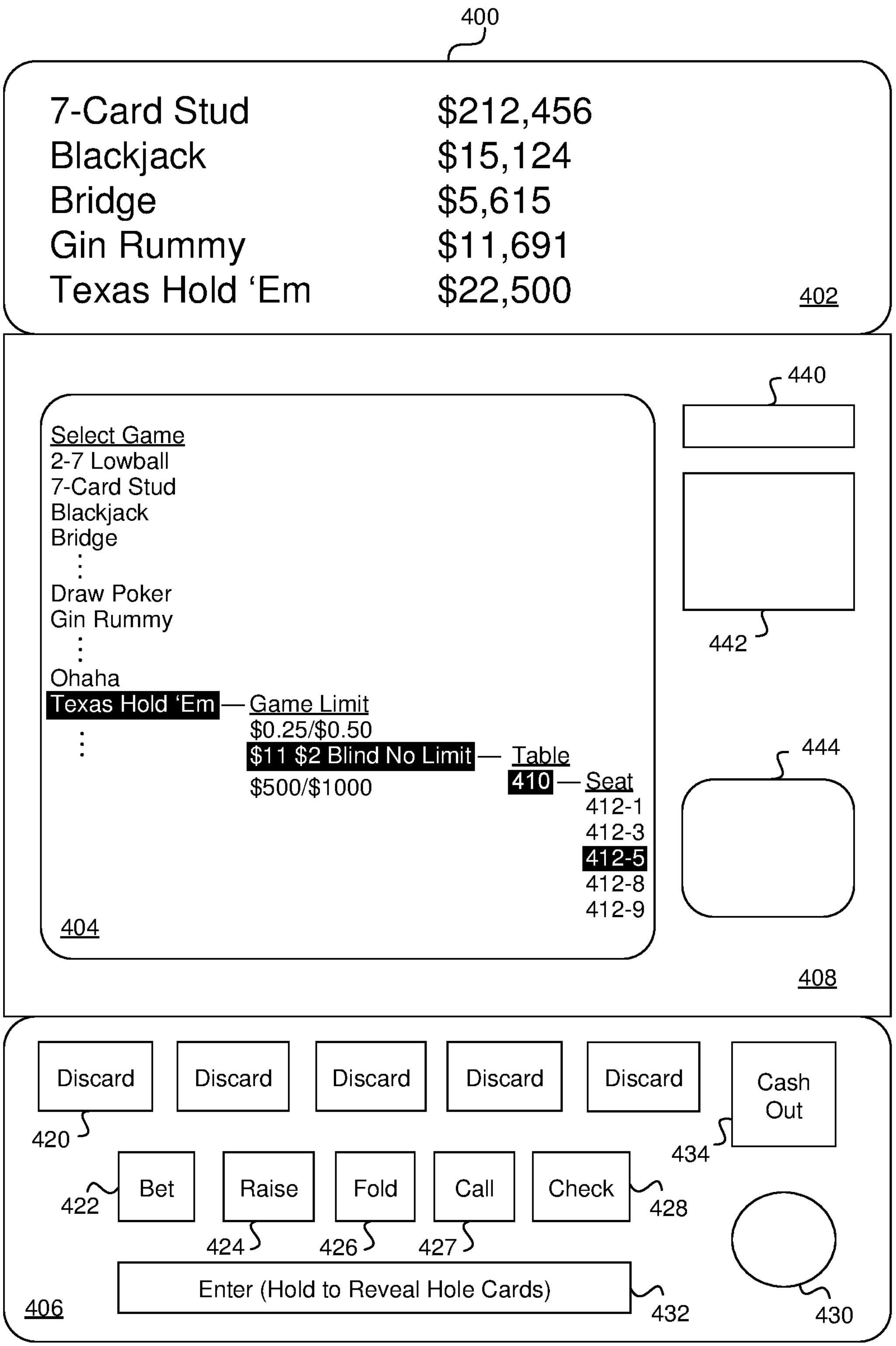
FIGS. 4A-4B illustrate an exemplary player terminal according to embodiments of the invention.
Figure 4B:
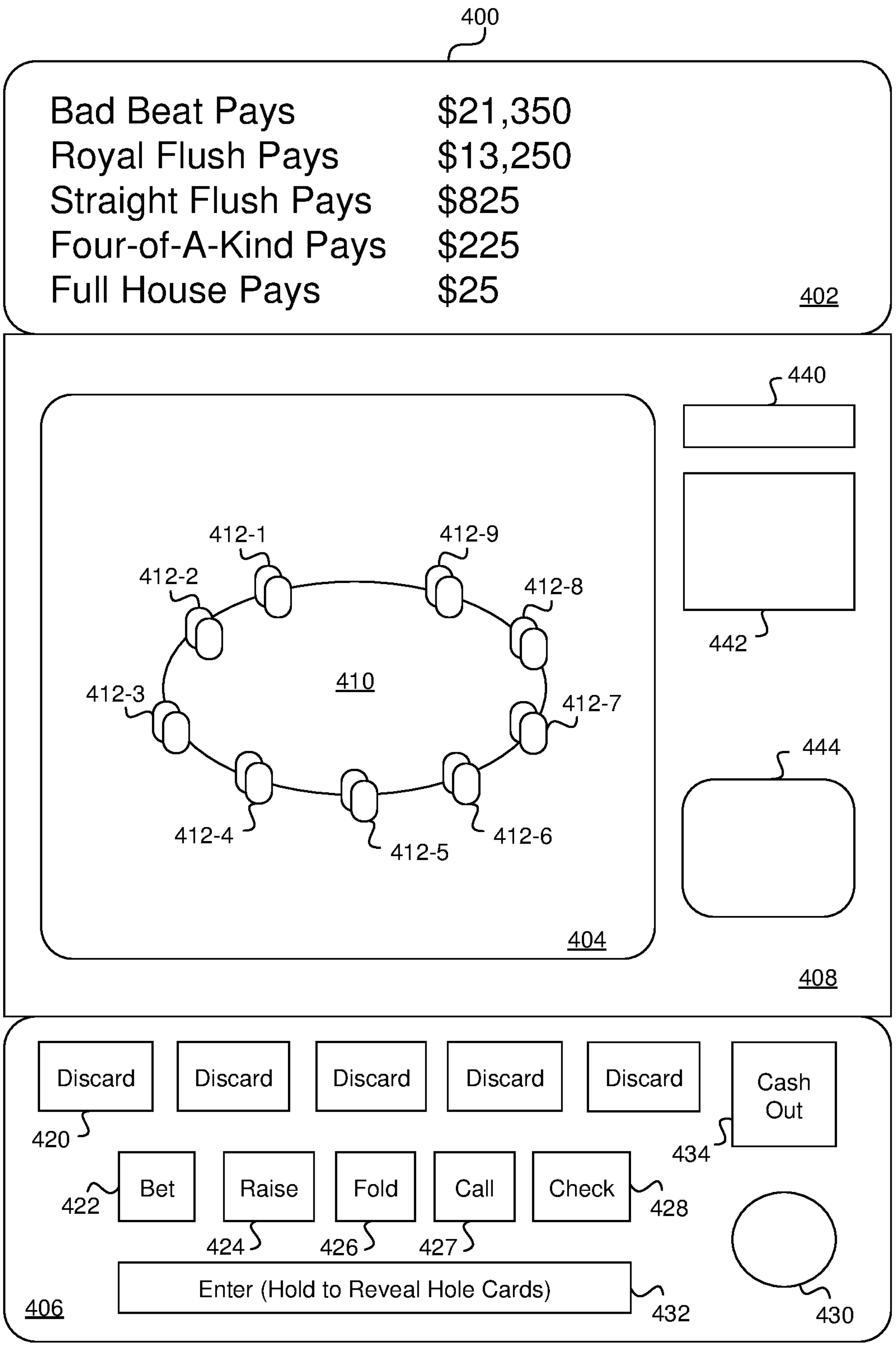

FIGS. 4A-4B illustrate an exemplary player terminal 400 according to embodiments of the invention. Only the most relevant aspects of the user interface portion of the player terminal 400 are illustrated and described here. It should be apparent that the user interface may be part of a hand-held player terminal, a free standing player terminal, a computing device configured as a player terminal, a "set-top" gaming console, and/or the like. Further, it is not necessary for all elements of the player terminal illustrated and described here to be included in the player terminal.

The terminal includes a jackpot payout information area 402, a game display area 404, a player interaction area 406, and a cash and credit interaction area 408. The jackpot payout information area 402 includes information about the status of jackpot accumulations. The amounts associated with the various jackpots may increase with time and may be game specific. For example, if the player terminal provides the possibility to engage in different types of games and limits, then the jackpot amounts displayed in the jackpot information area may change with different player game selections.

The game display area 404 provides a visual depiction of the game in which the player is involved. For example, the game display area 404 may show a poker table 410 and players 412 sitting around the table. As players are dealt cards, the cards may appear in front of each player. As players bet, chips may be displayed in front of the players. At the end of each betting round, the chips from the round may be scooped into the middle of the table to symbolize the pot for which the players are competing. As the action proceeds around the table, the next player to act may be highlighted and that player's terminal may beep, or otherwise alert the player that it is his turn to act. Community cards may appear on the table for all players to see. At the conclusion of the hand, the pot may be pushed to the winning player as the hole cards of all players still in the hand are revealed. Each player's present bankroll may be graphically or numerically displayed so that all players know how much each player has available to wager.

The game display area 404 may be where players look to view their hole cards. A player's hole cards may be continuously displayed. In some embodiments, however, steps are taken to help ensure a player's hole cards remain hidden from other players potentially playing at nearby terminals to thereby prevent cheating. In some embodiments, a button is included (e.g., the enter button 432) that causes the hole cards to be revealed. If the button is not depressed, then the hold cards are simply shown as face down. This way, players can quickly glance at their cards thereby reducing the risk that someone else can view their hole cards. In other embodiments, hole cards may be displayed on a separate display screen. In either case, shielding, glass coatings, polarization screens, and/or the like may be employed to prevent others from viewing a player's hole cards.

The player interaction area 406 includes player buttons, input devices, and the like through which players interact with the game. It should be appreciated that the player interaction area 406 may comprise touch screen buttons on the game display area 404. Hence, it should be understood that this embodiment is merely exemplary of a number of possible embodiments as will be appreciated by those skilled in the art.

The player interaction area 406 in this embodiment includes discard buttons 420 for draw games (e.g., 5-card draw, 2-7 triple draw lowball, etc.). Players use these buttons to identify cards to be discarded in a drawing round. The player interaction area 406 also includes a bet button 422, a raise button 424, a fold button 426, a call button 427, and a check button 428. These buttons are used to take the appropriate action according to each button's name. In some embodiments, additional input buttons and devices are included. For example, a track ball 430 may be included for indicating how much a player wants to bet in unstructured games. It also may be used to select from several choices displayed on the display screen 404. It may be used in combination with the enter button 432 to confirm a selection. A cash out button 434 allows a player to leave a game with the value the player has presently accumulated. Those skilled in the art will appreciate many other possibilities in light of this disclosure.

The cash and credit interaction area 408 provides a loyalty card accepter 440, a bill or ticket accepter/dispenser 442, and a coin dispenser 444. These items work in ways similar to analogous devices on, for example, video poker machines, except that the player terminal sends signals to the host computer system in response to player actions taken with respect to cashing in and out.

Those skilled in the art will appreciate that the foregoing description is merely exemplary of a number of possible player terminal embodiments. For example, other embodiments may include all touch screen controls, may only accept bills and dispense tickets, may not include jackpot values, and the like. Most embodiments, however, minimally include a display area through which the action is depicted and which may include player input buttons that change depending on the state of the game. It should also be appreciated that the display region may show display screens that allow players to select games and limits, enter personal information, if desired, and advertise promotions and the like when the terminal is not in use. Many other possibilities exist and are apparent to those skilled in the art in light of this disclosure.

Figure 5:
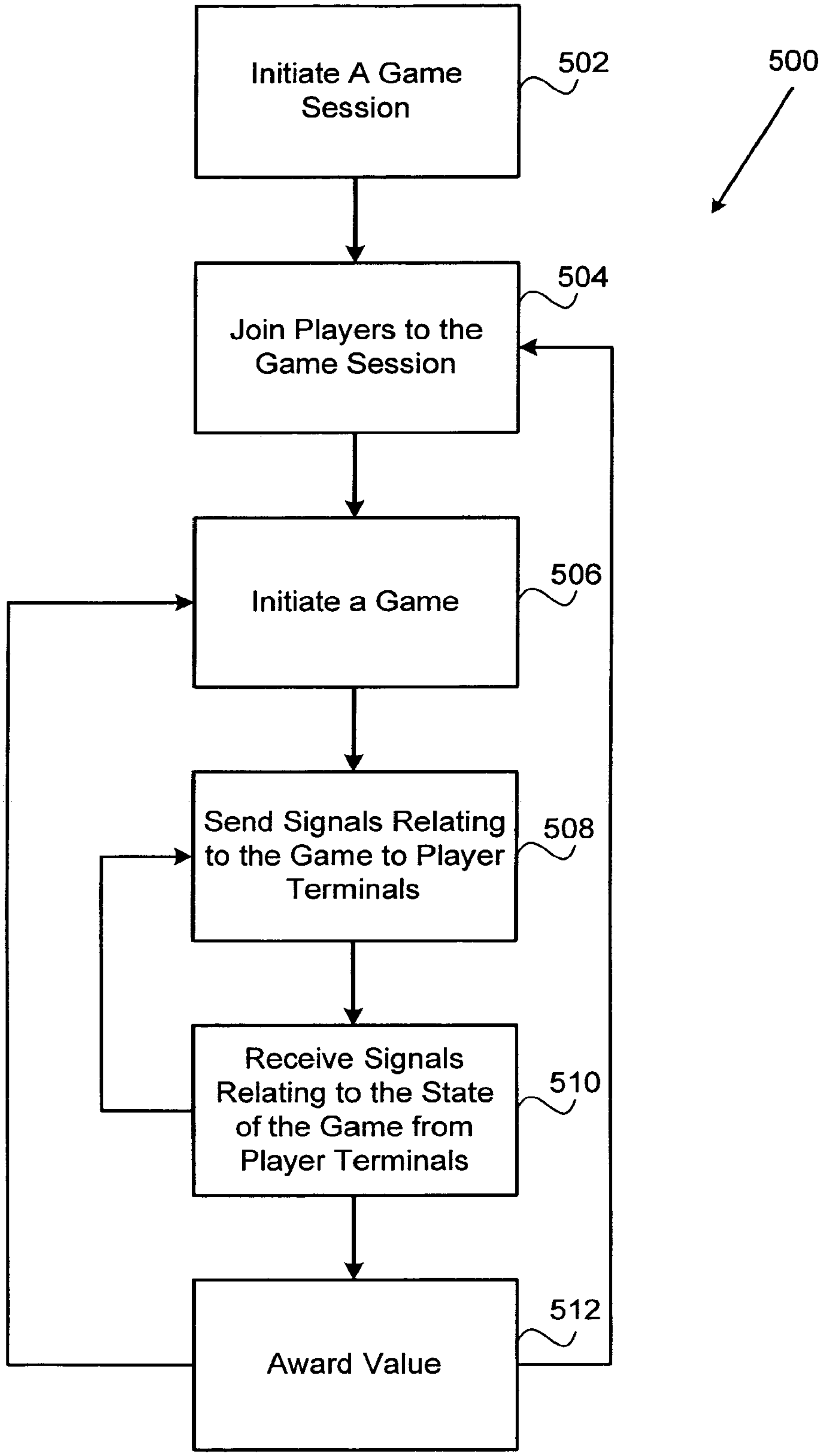
FIG. 5 illustrates an exemplary method according to embodiments of the invention.

An exemplary method 500 according to embodiments of the invention is illustrated in FIG. 5. The method may be implemented in the system 100 of FIG. 1 or other appropriate system. Those skilled in the art will appreciate that other exemplary embodiments may include more, fewer, or different steps than those illustrated and described here. Further, other exemplary embodiments may traverse the steps in different orders than shown here.

The method 500 begins at block 502 at which a host computer system, such as the host computer system 102, initiates a game session. A game session, is, for example, a poker game among several players. The game session consists of one or more hands of poker in which players compete against one another for the pot. The game session could be a series of blackjack hands in which one or more players compete against the house as is known in the art. The game session also could be a series of hands of other games such as gin rummy, bridge, and the like.

In some embodiments, initiating a game session comprises making a selection available on one or more player terminals. The selection allows players at the player terminals to enter the game session. Any number of game sessions could be available at any given time for players to enter. The games may comprise a variety of games (Texas Hold'em, 7-Card Stud, Omaha, Draw poker, 2-7 lowball, Blackjack, Bridge, etc.) and a variety of limits ($0.25/$0.50, $11$2, $11$2 Blind No Limit, $10/$20, $500/$1000, etc.). In some embodiments the game session is a tournament, which may be a single-table tournament or a multi-table tournament.

At block 504, players are joined to the game session. This may comprise receiving a signal from a player terminal that the player desired to enter the game and has deposited sufficient funds to enter the game. The player is assigned to a seat (or is allowed to select a seat) at a virtual table, which may be displayed as shown in FIG. 4B. The player's bankroll (i.e., the player's stake in the game) may be depicted at the virtual table.

In some embodiments, players may be provided with an option to change their perspective of the virtual table. For example, a player may desire to "sit" at the bottom of the table in the seat identified as 412-5 in FIG. 4B. If the player is seated in a different seat, the player may elect to "rotate" the perspective of the table so that the player is depicted in the desired position. This does not change the player's position at the table with respect to the other players; it merely changes the player's perspective for display purposes. This option may be useful in reducing cheating, since the player may relocate his position at the table to a position that obstructs the view of a potential cheater located near the player's terminal. Of course, a player may elect to take a different seat at the table in some embodiments.

In some embodiments, players are randomly assigned to a game session. While a player may identify the game and limit the player wants to play, the table to which the player is assigned is not up to the player. This minimizes the chance that a group of colluding players are able to sit at the same table. Of course, a player can always request a table change or leave the game entirely.

In some embodiments, players enter a waiting list for certain games and limits. If, for example, all the seats at a desired table are taken, a player may request to be placed on a list for that game. Players may enter waiting lists for specific games and/or limits. When a seat opens in a game session that corresponds to the list in which a player is waiting at the top of the list, the player is given the opportunity to enter the game session.

As described previously, collusion or other forms of cheating may be addressed by prohibiting players from engaging in the same game session from locations proximate one another. For example, if a casino has a plurality of player terminals distributed throughout the casino, then players may be prevented from joining the same game session from neighboring terminals. After a player joins a game session from a specific terminal, nearby terminals are "locked out" of that game session. The same process may be followed at all locations. If players are playing from wireless terminals, the wireless terminals may have proximity detection features that perform a similar function of locking out nearby terminals. Many other possibilities exist.

Once a sufficient number of players are joined to a game session, a game, or hand, is initiated at block 506. If, for example, the game is Texas Hold'em Poker, two cards are dealt to each player in the hand.

At block 508, the game proceeds as is known in the art, with the host computer system sending signals to each player terminal indicating the state of the game. The player terminals provide a visual representation of the game state, and a player whose turn it is to act is provided with a set of options. Hence, play continues at block 510 with the host computer system receiving signals indicating a player's action. The actions of blocks 508 and 510 continue with players interactively checking, betting, raising, calling, or folding and the host computer system updating the state of the game by sending signals to the player terminals. If the game limits are fixed, players merely need to indicate their selection for the action to proceed. If, however, the game is "no limit," "pot limit," or another non-structured betting limit, then players also indicate the size of each bet.

At block 512, a winner is determined and the value of the pot is awarded to the winning player. A new game may then be initiated at block 506. Since players are able to enter and leave game sessions at any time, new players may be joined at block 504 to replace any players that leave the game session. While the foregoing description focused on poker being played in the game session, those skilled in the art will appreciate that other forms of poker and other interactive games may be played according to other embodiments of the invention.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention, which is defined in the following claims.

The invention claimed is:

1. An electronic card game system comprising:

one or more processors; and a player terminal comprising:

a cash and credit area configured to: receive value from a player, and cause the one or more processors to generate a credit total;

a touch screen display to: depict action from an electronic card game, and present a virtual card table with player cards from the electronic card game distributed to the player; and a player interaction area including interactive buttons that dynamically change depending on a state of the electronic card game, wherein the player interaction area displays virtual chips in front of the player representing the credit total available to be bet by the player;

the system further comprising a memory having instructions stored thereon that, when executed by the one or more processors, cause the system to:

receive, via the player interaction area, a card game selection by the player from a listing of one or more electronic card games;

initiate, upon receiving the card game selection, the selected electronic card game on the player terminal in response to one or more other players joining the selected electronic card game using other player terminals, wherein players making the same card game selection from the listing of one or more electronic game cards are randomly assigned to one of a plurality of game sessions for the selected electronic card game to facilitate reducing an ability of a group of players to collude or cheat in the selected electronic card game;

receive, via the player interaction area, a bet having a betting value;

deduct, upon receiving the bet, the betting value from the credit total;

receive, via the player interaction area, a first interaction from the player in the electronic game; and cause, upon completion of at least one interaction, or bet, by the one or more other players in turn in the selected electronic card game, an alert to be provided via the player terminal to the player to inform the player of the player's turn to provide, via the player interaction area, at least a second interaction in the selected electronic card game.

2. The electronic card game system of claim 1, wherein, upon conclusion of the electronic card game, a pot of virtual chips is visually pushed to the player.

3. The electronic card game system of claim 1 further comprising:

a communications component to connect the respective player terminals to a host computer system that includes a game processor to control the selected electronic card game using computer-executable code retrieved from a game storage arrangement; and a collusion detection processor to monitor unusual activity taken by the player, wherein the unusual activity includes frequent occurrences of two or more players playing together.

4. The electronic card game system of claim 1, wherein at least one of: the player, and the one or more other players, is joined to the selected electronic card game anonymously and in the absence of creating a user account.

5. The electronic card game system of claim 1, wherein the player interaction area includes at least one of: a button, a trackball, and an actuator.

6. The electronic card game system of claim 1, wherein the touch screen display further presents the virtual card table with community cards displayed face up.

7. The electronic card game system of claim 1, wherein the touch screen display further presents the virtual card table with at least some of the player cards distributed to the player face down.

8. A method in a computing system for operating an electronic card game, the method comprising:

receiving value from a player of the electronic card game via a cash and credit area of a first player terminal, wherein receiving value causes a credit total to be generated by the computing system for the player;

receiving, via a player interaction area of the first player terminal, a card game selection by the player from a listing of one or more electronic card games;

upon receiving the card game selection, initiating the selected electronic card game on the first player terminal in response to one or more other players joining the selected electronic card game using other player terminals, wherein initiating the selected electronic card game comprises:

randomly assigning the player to one of a plurality of game sessions for the selected electronic card game to facilitate reducing an ability of a group of players to collude or cheat in the selected electronic card game, presenting to the player, via a touch screen display of the first player terminal, a virtual card table with player cards from the electronic card game distributed to the player, displaying interactive buttons to the player via the player interaction area, and displaying, via the touch screen display, virtual chips corresponding to the credit total of the player;

receiving, via the player interaction area, a bet, and a first interaction, by the player in the selected electronic card game, wherein receiving the bet causes a value of the bet to be deducted by the computing system from the credit total, and wherein receiving the first interaction comprises depicting action from the selected electronic interactive game to the player and the one or more other players via touch screen displays of respective player terminals;

changing an appearance of the interactive buttons responsive to a change in state of the electronic card game; and causing, upon completion of at least one interaction, or bet, by the one or more other players in turn in the selected electronic card game, an alert to be provided via the first player terminal to the player to inform the player of the player's turn to provide, via the player interaction area, at least a second interaction or bet in the selected electronic card game.

9. The method of claim 8 further comprising visually pushing, via the touch screen display, a pot of virtual chips to a winning player at the conclusion of the electronic card game.

10. The method of claim 8 further comprising:

connecting, via a communications component of the respective player terminals, the respective player terminals to a host computer system that includes a game processor to control the electronic card game using computer-executable code retrieved from a game storage arrangement; and monitoring unusual activity taken by the player or the one or more other players in the electronic card game, wherein the unusual activity includes frequent occurrences of two or more players playing together.

11. The method of claim 8, wherein initiating the selected electronic card game further comprises joining at least one of: the player, and the one or more other players, to the electronic card game anonymously and in the absence of creating a user account.

12. The method of claim 8, wherein at least one of: receiving a card game selection by the player, and receiving a bet and a first interaction by the player in the selected electronic card game, comprises receiving an input from the player using one or more of: a button, a trackball, and an actuator, of the player interaction area.

13. The method of claim 8, wherein presenting a virtual card table to the player comprises at least one of:

presenting the virtual card table with community cards displayed face up; and presenting the virtual card table with at least some of the player cards distributed to the player face down.

14. A non-transitory computer-readable medium having stored thereon executable instructions which, when executed by one or more processors of an electronic card game system having a plurality of player terminals, cause the electronic card game system to:

receive value from a player of an electronic card game via a cash and credit area of a first player terminal;

cause a credit total to be generated for the player upon receiving value;

receive, via a player interaction area of the first player terminal, a card game selection by the player from a listing of one or more electronic card games;

initiate, upon receiving the card game selection, the selected electronic card game on the first player terminal in response to one or more other players joining the selected electronic card game using other player terminals, wherein, for initiating the selected electronic card game, the executable instructions further cause the electronic card game system to:

randomly assign the player to one of a plurality of game sessions for the selected electronic card game to facilitate reducing an ability of a group of players to collude or cheat in the selected electronic card game, present, via a touch screen display of the first player terminal, a virtual card table to the player with player cards distributed to the player, display interactive buttons to the player via the player interaction area, and display, via the touch screen display, virtual chips corresponding to the credit total of the player;

receive, via the player interaction area, a bet, and a first interaction, by the player in the selected electronic card game, wherein, for receiving the bet and the first interaction, the executable instructions further cause the electronic card game system to:

deduct a value of the bet from the credit total, and depict action from the selected electronic interactive game to the player and the one or more other players via touch screen displays of respective player terminals;

change an appearance of the interactive buttons responsive to a change in state of the electronic card game; and cause, upon completion of at least one interaction, or bet, by the one or more other players in turn in the selected electronic card game, an alert to be provided via the first player terminal to the player to inform the player of the player's turn to provide, via the player interaction area, at least a second interaction or bet in the selected electronic card game.

15. The non-transitory computer-readable medium of claim 14, wherein the executable instructions executed by the one or more processors further cause the electronic card game system to visually push, via the touch screen display, a pot of virtual chips to a winning player at the conclusion of the electronic card game.

16. The non-transitory computer-readable medium of claim 14, wherein the executable instructions executed by the one or more processors further cause the electronic card game system to:

connect, via a communications component of the respective player terminals, the respective player terminals to a host computer system that includes a game processor to control the electronic card game using computer-executable code retrieved from a game storage arrangement; and monitor unusual activity taken by the player or the one or more other players in the electronic card game, wherein the unusual activity includes frequent occurrences of two or more players playing together.

17. The non-transitory computer-readable medium of claim 14, wherein, for initiating the selected electronic card game, the executable instructions executed by the one or more processors further cause the electronic card game system to join at least one of:

the player, and the one or more other players, to the electronic card game anonymously and in the absence of creating of a user account.

18. The non-transitory computer-readable medium of claim 14, wherein, for at least one of: receiving a card game selection by the player, and receiving a bet and a first interaction by the player in the selected electronic card game, the executable instructions executed by the one or more processors further cause the electronic card game system to: receive an input from the player using one or more of: a button, a trackball, and an actuator, of the player interaction area.

19. The non-transitory computer-readable medium of claim 14, wherein, for presenting a virtual card table to the player, the executable instructions executed by the one or more processors further cause the electronic card game system to present the virtual card table with community cards displayed face up.

20. The non-transitory computer-readable medium of claim 14, wherein, for presenting a virtual card table to the player, the executable instructions executed by the one or more processors further cause the electronic card game system to present the virtual card table with at least some of the player cards distributed to the player face down.

* * * * *